United States Patent [19]

Daly

[11] Patent Number: 4,938,909

[45] Date of Patent: Jul. 3, 1990

[54] FLASH-FREE MOLDING OF I.C. ENGINE PASSAGES

[75] Inventor: Paul D. Daly, Troy, Mich.

[73] Assignee: Siemens-Bendix Automotive Electronics L.P., Troy, Mich.

[21] Appl. No.: 310,973

[22] Filed: Feb. 15, 1989

[51] Int. Cl.$^5$ .............................................. B29C 33/76
[52] U.S. Cl. ................... 264/219; 249/145; 249/146; 249/186; 264/318; 264/334; 425/438; 425/577
[58] Field of Search ...................... 264/219, 328.1, 334, 264/318; 425/577, 438, DIG. 58, DIG. 59, DIG. 10; 249/145, 146, 184, 186

[56] References Cited

U.S. PATENT DOCUMENTS 2,181,256 11/1939 Arbogast .............................. 249/145
4,240,498 12/1980 Frenette ................................ 425/577

Primary Examiner—Jill L. Heitbrink
Attorney, Agent, or Firm—George L. Boller; Russel C. Wells

[57] ABSTRACT

A method of making a molded plastic component of an internal combustion engine. The method is for making a fuel rail and includes constructing particular core pins of the mold with threaded connections that form seals between them when they are disposed in proper position within the mold cavity for the molding of a fuel rail. The core pins serve to form a main fuel passage and auxiliary fuel passages which transversely intersect the main fuel passage. Each core pin that forms an auxiliary fuel passage includes a screw thread on its inner end that threads into a corresponding complementary threaded recess in the side of the core pin that forms the main fuel passage to create a corresponding seal. This sealing prevents any significant flash from forming in the fuel rail at the intersection of each auxiliary fuel passage with the main fuel passage. After the plastic has been molded, the core pins are unthreaded and withdrawn.

15 Claims, 2 Drawing Sheets

FLASH-FREE MOLDING OF I.C. ENGINE PASSAGES

BACKGROUND AND SUMMARY OF THE INVENTION

This invention relates to internal combustion (I.C.) engines and more specifically to a novel method for fabricating components of such engines by plastic molding. The invention eliminates flash at the intersection of passages within the components, wherein the intersecting passages are formed by different core pins inserted into the molding cavity. The invention will be described with reference to the molding of fuel passages in a molded plastic fuel rail.

In the practice of molding I.C. fuel rails from plastic, fuel passages are formed in the molded part by disposing core pins in the mold cavity and molding the part around these core pins. Where passages intersect, there is a separate core pin for each intersecting passage, and it has been the practice to abut the end of one core pin with the side of another at each point of intersection. When plastic is injected under high pressure into the mold cavity, it can intrude between the abutting and abutted core pins and create a residual thin film, or flash, at the intersection of two fuel passages. Such flash can impair the fuel flow from one passage to the other. Where fuel is introduced into the engine's air/fuel system by means of an electromagnetic fuel injector, flash in a fuel path feeding the injector can have a negative effect on accuracy of fuel injection. It is therefore necessary to remove such flash by secondary operations in order to make the molded part commercially suitable. Unfortunately, the need for secondary operations adds to the manufacturing cost. Also, if the material comprising the flash separates from the main fuel rail, then it can become lodged in some other part of the fuel system, e.g. an injector or regulator.

Even if an attempt is made to solve the problem by providing a close fitting abutment of the end of one core pin with the side of another core pin, significant axial force must be imparted to the one core pin, and this will give rise to core pin deflection that defeats the close fit so that flash is likely to be formed in any event. Repeated cycling of a mold also results in core pin wear that amplifies the flash problem over the course of a production run. This flash problem is a serious impediment to the successful commercial development of mass-produced molded plastic fuel rails.

The present invention relates to a novel method for making molded plastic fuel rails that solves this flash problem. Instead of merely forcefully abutting the end of one core pin with the side of another, the solution that is disclosed by the present invention involves providing a threaded projection at the end of the abutting core pin and a complementary threaded recess in the side of the abutted core pin, and tightly threading the end of the abutting core pin into the threaded recess in the side of the abutted core pin to thereby form a seal between the two. This screw thread connection greatly increases the magnitude of force by which a shoulder on the abutting core pin can be urged against the abutted core pin so that as a consequence, a highly effective seal is attained by the abutment of this shoulder with the side of the abutted core pin. The creation of flash at the intersection of two fuel passages is thereby essentially eliminated. After the fuel rail has been molded, the threaded connections are unthreaded and the core pins are withdrawn, thereby allowing the molded part to be removed from the mold cavity. The present invention is a significant step in making molded plastic fuel rails feasible for commercial mass production.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
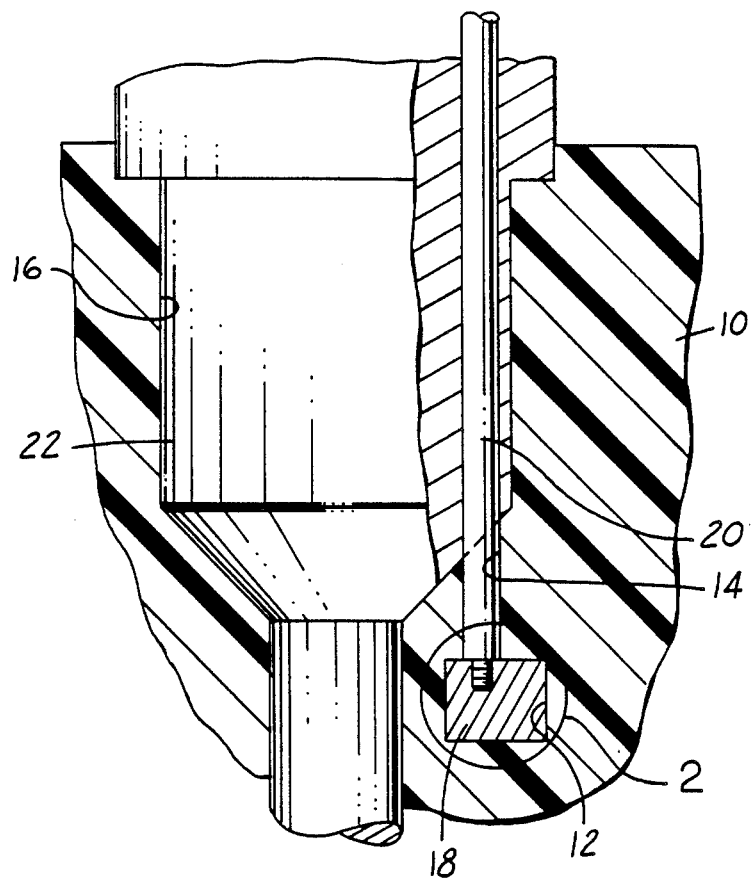
FIG. 1 is fragmentary sectional view through a portion of a fuel rail after it has been molded, but before the core pins that form two intersecting fuel passages have been unthreaded from each other and withdrawn from the molded part.
Figure 2:
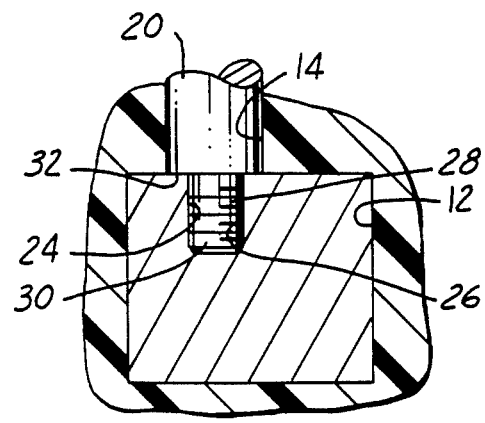
FIG. 2 is an enlarged view in circle 2 of FIG. 1.

FIGS. 1 and 2 show a portion of a plastic fuel rail 10. The fuel rail comprises a main fuel passage 12 that serves a plurality of transversely intersecting auxiliary passages 14 each of which in turn serves a corresponding electromagnetic fuel injector (not shown). Hence, FIG. 1 shows passage 14 leading to an injector cavity 16 that is adapted to receive a fuel injector. When the fuel rail is in use, a pump (not shown) pumps fuel through main passage 12, and in turn each passage 14, to each fuel injector. The injectors are operated by an electronic control unit in timed relation to spray fuel into the engine cylinders where combustion takes place.

Fuel rail 10 is molded in a mold having a suitably shaped cavity. Core pins 18 and 20 are used to form passages 12 and 14 respectively. A core pin 22 is used to form the injector cavity 16. The condition portrayed by FIGS. 1 and 2 is after plastic has been introduced in the cavity to form the plastic fuel rail, but before core pins 18, 20 and 22 have been withdrawn.

Core pin 18 has a length that is perpendicular to the plane of FIGS. 1 and 2. In its sidewall that confronts the inner end of core pin 20, core pin 18 is provided with a circular cylindrical recess 24 containing a female screw thread 26. The inner end of core pin 20 comprises a circular cylindrical projection 28 containing a male screw thread 30. As can be seen, the threaded projection 28 has been threaded into threaded recess 24. A sufficient tightening of the threaded connection has forcefully abutted a shoulder 32 of core pin 20 against the side wall of core pin 18 so that a seal is thereby formed between said shoulder and said side wall that prevents intrusion of plastic through and beyond said seal. In other words, plastic cannot intrude between shoulder 32 and the side wall of core pin 18.

Figure 3:
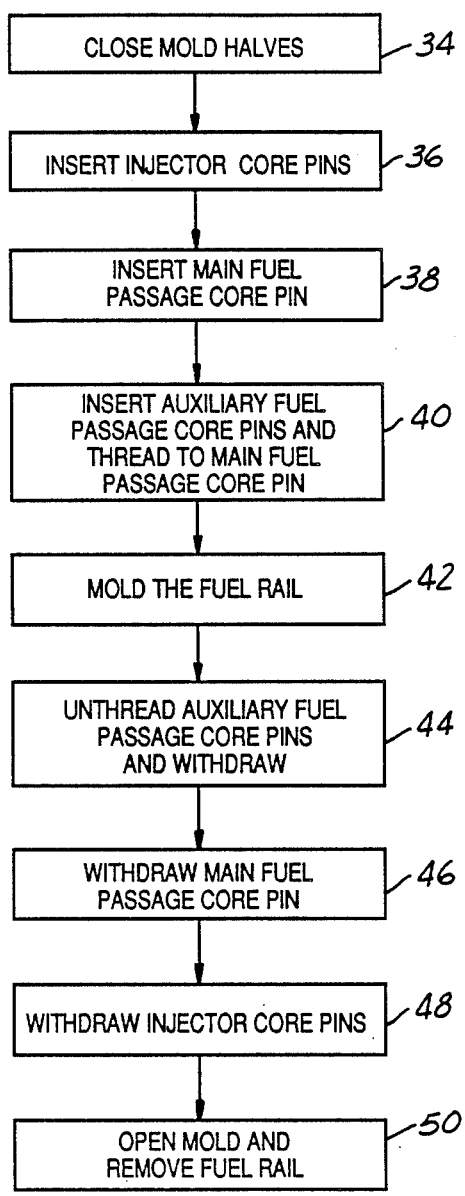
FIG. 3 is a block diagram presenting steps in the exemplary method of the present invention.

FIG. 3 portrays the steps of the exemplary method. The first step 34 in the process involves closing of the two mold halves so that the mold cavity is thereby enclosed. The second step 36 comprises inserting the core pins 22 into the mold cavity. For the third step 38, core pin 18 is axially advanced into the mold cavity until each threaded recess 26 is in alignment with a corresponding core pin 20. Next, the auxiliary passage core pins 20 are inserted and threaded to corresponding threaded recesses 24 in the main fuel passage core pin 18 (step 40). It can be seen that threaded projections 28 are coaxial with the corresponding core pins 20 so that rotation of each core pin 20 will be effective to engage its screw thread 28 with the screw thread 26 of the corresponding aligned receptacle 24. As noted above, the core pins 20 are threaded into the core pin 18 with sufficient tightness that a seal is formed by the abutment of each shoulder 32 with the side wall of core pin 18. Note that while a square shoulder seal is shown, a tapered cone, or spherical seal could be used if preferred.

The next step 42 is to mold the fuel rail by introducing plastic into the mold cavity. It is contemplated that any conventional molding procedure may be utilized. Examples of such procedures are injection molding and transfer molding. After the molded part has solidified to a sufficient degree, the core pins 20 are unthreaded from core pin 18 and axially withdrawn (step 44). Thereafter core pin 18 and the injector core pins 22 are withdrawn (steps 46 and 48). Finally the mold is opened and the finished fuel rail removed (step 50).

It is to be understood that the sequence of operations that has just been described need not necessarily be performed in the disclosed sequential order except that core pin 18 must be fully advanced before core pins 20 can be threaded into it, and core pins 20 must be unthreaded from core pin 18 before core pin 18 can be withdrawn. There may also be some overlap in some of the steps of the process for the purpose of minimizing the cycle time.

Calculations show that a pressure of approximately 20,000 psi is easily obtainable on shoulder 32 using a $\frac{1}{4}$-20 screw thread and a torque of 15 lb-ins. An alternate embodiment utilizing a tapered screw thread would allow insertion and clamping torque to be obtained faster—one turn or less.

While a preferred embodiment of the invention has been disclosed and described, it will be appreciated that principles are applicable to other embodiments.

What is claimed is:

1. The method of making a molded plastic fuel rail for an internal combustion engine, said fuel rail having an injector socket for receiving a fuel injector that is used to inject fuel into the engine, a main fuel passage through which a fuel passes through the rail, and an auxiliary fuel passage through which said fuel passes from the main fuel passage to a fuel injector when an injector is disposed in the injector socket, said main fuel passage and said auxiliary fuel passage being transversely intersecting, said method serving to avoid the formation of flash at the intersection of said passages and comprising:

providing a mold having a cavity shaped to mold the fuel rail;

providing a first core pin for disposition in said cavity and around which one of said fuel passages will be molded, including providing in said first core pin a recess which contains a first screw thread whose axis is transverse to the length of said first core pin;

providing a second core pin for disposition in said cavity and around which the other of said fuel passages will be molded, including providing at one end of said second core pin a projection containing a second screw thread, said projection and said second screw thread being complementary to said recess and said first screw thread;

disposing said first core pin and said second core pin in positions within said cavity for the molding of a fuel rail, including the step of rotating the second core pin about the axis of said second screw thread so as to tightly thread the two screw threads together and forcefully abut said second core pin with a side wall of said first core pin to create between them a seal which closes off said projection, said recess and said screw threads but leaves exposed within said cavity those portions of said two core pins that are immediately contiguous said seal exterior of the closed-off projection, recess and screw threads;

introducing plastic into said cavity to mold said fuel rail, said one fuel passage being formed about said first core pin including the portion thereof immediately contiguous said seal and said other fuel passage being formed about said second core pin including the portion thereof immediately contiguous said seal, said seal preventing the plastic from reaching said projection, said recess and said screw threads so that the formation of flash is thus avoided;

after said fuel rail has been molded, rotating said second core pin to unthread the two screw threads and thereby destroy said seal;

and after the screw threads have been unthreaded, withdrawing the core pins from the respective passages.

2. The method set forth in claim 1 wherein said seal is created by providing a shoulder on said second core pin adjacent said projection and abutting said shoulder with a peripheral surface of said first core pin surrounding said recess.

3. The method set forth in claim 1 wherein the step of disposing said first core pin and said second core pin in said positions within said cavity for the molding of said fuel rail comprises first disposing said first core pin in the position within said cavity and then axially advancing said second core pin into the cavity, the step of rotating the second core pin about the axis of said second screw thread so as to tightly thread the two screw threads together and create said seal being performed at the conclusion of axially advancing said second core pin into the cavity.

4. The method set forth in claim 3 wherein the step of disposing said first core pin in the position within said cavity comprises axially advancing said first core pin into said cavity.

5. The method set forth in claim 1 wherein said first core pin is used to form the main fuel passage and said second core pin is used to form the auxiliary fuel passage.

6. The method of making a molded plastic component of an internal combustion engine, said component having a first passage through which a fluid passes through the component, and a second passage through which said fluid passes from the first passage, said first passage and said second passage being transversely intersecting, said method serving to avoid the formation of flash at the intersection of said passages and comprising:

providing a mold having a cavity shaped to mold the component;

providing a first core pin for disposition in said cavity and around which one of said passages will be molded, including providing in said first core pin a recess which contains a first screw thread whose axis is transverse to the length of said first core pin;

providing a second core pin for disposition in said cavity and around which the other of said passages will be molded, including providing at one end of said second core pin a projection containing a second screw thread, said projection and said second screw thread being complementary to said recess and said first screw thread;

disposing said first core pin and said second core pin in positions within said cavity for the molding of the component, including the step of rotating the second core pin about the axis of said second screw thread so as to tightly thread the two screw threads together and forcefully abut said second core pin with a side wall of said first core pin to create between them a seal which closes off said projection, said recess and said screw threads but leaves exposed within said cavity those portions of said two core pins that are immediately contiguous said seal exterior of the closed-off projection, recess and screw threads;

introducing plastic into said cavity to mold the component, said one passage being formed about said first core pin including the portion thereof immediately contiguous said seal and said other passage being formed about the second core pin including the portion thereof immediately contiguous said seal, said seal preventing the plastic from reaching said projection, said recess and said screw threads so that the formation of flash is thus avoided;

after said component has been molded, rotating said second core pin to unthread the two screw threads and thereby destroy said seal;

and after the screw threads have been unthreaded, withdrawing the core pins from the respective passages.

7. The method set forth in claim 6 wherein said seal is created by providing a shoulder on said second core pin adjacent said projection and abutting said shoulder with a peripheral surface of said first core pin surrounding said recess.

8. The method set forth in claim 6 wherein the step of disposing said first core pin and said second core pin in said positions within said cavity for the molding of the component comprises first disposing said first core pin in the position within said cavity and then axially advancing said second core pin into the cavity, the step of rotating the second core pin about the axis of said second screw thread so as to tightly thread the two screw threads together and create said seal being performed at the conclusion of axially advancing said second core pin into the cavity.

9. The method set forth in claim 8 wherein the step of disposing said first core pin in the position within said cavity comprises axially advancing said first core pin into said cavity.

10. The method set forth in claim 6 wherein said first core pin is used to form the first passage and said second core pin is used to form the second passage.

11. The method of making a molded plastic component having a first passage through which a fluid passes through the component, and a second passage through which the fluid passes from the first passage, said first passage and said second passage being transversely intersecting, said method serving to avoid the formation of flash at the intersection of said passages and comprising:

providing a mold having a cavity shaped to mold the component;

providing a first core pin for disposition in said cavity and around which one of said passages will be molded, including providing in said first core pin a recess which contains a first screw thread whose axis is transverse to the length of said first core pin;

providing a second core pin for disposition in said cavity and around which the other of said passages will be molded, including providing at one end of said second core pin a projection containing a second screw thread, said projection and said second screw thread being complementary to said recess and said first screw thread;

disposing said first core pin and said second core pin in positions within said cavity for the molding of the component, including the step of rotating the second core pin about the axis of the second screw thread so as to tightly thread the two screw threads together and forcefully abut said second core pin with a side wall of said first core pin to create between them a seal which closes off said projection, said recess and said screw threads but leaves exposed within said cavity those portions of said two core pins that are immediately contiguous said seal exterior of the closed-off projection, recess and screw threads;

introducing plastic into said cavity to mold the component, said one passage being formed about the first core pin including the portion thereof immediately contiguous said seal and said other passage being formed about the second core pin including the portion thereof immediately contiguous said seal, said seal preventing the plastic from reaching said projection, said recess and said screw threads so that the formation of flash is thus avoided;

after said component has been molded, rotating said second core pin to unthread the two screw threads and thereby destroy said seal;

and after the screw threads have been unthreaded, withdrawing the core pins from the respective passages.

12. The method set forth in claim 11 wherein said seal is created by providing a shoulder on said second core pin adjacent said projection and abutting said shoulder with a peripheral surface of the first core pin surrounding said recess.

13. The method set forth in claim 11 wherein the step of disposing said first core pin and said second core pin in said positions within said cavity for the molding of the component comprises first disposing the first core pin in the position within said cavity and then axially advancing said second core pin into the cavity, the step of rotating the second core pin about the axis of the second screw thread so as to tightly thread the two screw threads together and create said seal being performed at the conclusion of axially advancing said second core pin into the cavity.

14. The method set forth in claim 13 wherein the step of disposing said first core pin in the position within said cavity comprises axially advancing the first core pin into said cavity.

15. The method set forth in claim 11 wherein said first core pin is used to form the first passage and said second core pin is used to form the second passage.

* * * * *